(12) United States Patent
Gutmann et al.

(10) Patent No.: US 8,482,235 B2
(45) Date of Patent: Jul. 9, 2013

(54) FAN ARRANGEMENT IN WHICH THE CONSUMED ELECTRIC POWER IS INFLUENCED

(75) Inventors: Markus Gutmann, March (DE); Arno Karwath, Deisslingen (DE); Thomas Dufner, Schonach (DE)

(73) Assignee: EBM-Papst St. Georgen GmbH & Co. KG, St. Georben (DE)

( * ) Notice: Subject to any disclaimer, the term of this patent is extended or adjusted under 35 U.S.C. 154(b) by 324 days.

(21) Appl. No.: 12/743,571

(22) PCT Filed: Nov. 17, 2008

(86) PCT No.: PCT/EP2008/009702
§ 371 (c)(1),
(2), (4) Date: Jun. 3, 2010

(87) PCT Pub. No.: WO2009/065540
PCT Pub. Date: May 28, 2009

(65) Prior Publication Data
US 2010/0283420 A1   Nov. 11, 2010

(30) Foreign Application Priority Data
Nov. 19, 2007   (DE) .................. 10 2007 057 100

(51) Int. Cl.
   *H02P 7/29*   (2006.01)
(52) U.S. Cl.
   CPC ..................................... *H02P 7/29* (2013.01)
   USPC .................................................. 318/434
(58) Field of Classification Search
   CPC ..................................................... H02P 7/29
   USPC ..................................................... 318/434
   See application file for complete search history.

(56) References Cited

U.S. PATENT DOCUMENTS

| 4,268,781 | A * | 5/1981 | Kawada et al. ............... 318/434 |
| 6,301,090 | B1 | 10/2001 | Mack et al. .................... 361/25 |
| 6,779,981 | B2 | 8/2004 | Huang et al. .................. 417/42 |
| 6,882,122 | B1 | 4/2005 | Sutter et al. ................... 318/254 |
| 7,456,597 | B2 | 11/2008 | Kanamori et al. ............ 318/599 |
| 2006/0226799 | A1 | 10/2006 | Lin et al. ....................... 318/139 |
| 2008/0310967 | A1 * | 12/2008 | Franz et al. ..................... 417/32 |

FOREIGN PATENT DOCUMENTS

| DE | 19816837 A | 3/1999 |
| DE | 19944194 A | 3/2001 |
| DE | 10040080 A | 3/2002 |
| DE | 10115675 A | 10/2002 |
| DE | 202004006714 U | 7/2004 |
| EP | 0 518 538 A | 12/1992 |

OTHER PUBLICATIONS

Engineering Toolbox, "Process Controllers" 2005, www.engineeringtoolbox.com.

(Continued)

*Primary Examiner* — Derek Rosenau
(74) *Attorney, Agent, or Firm* — Milton Oliver, Esq.; Oliver Intellectual Property LLC

(57) ABSTRACT

A fan arrangement (20) has a fan (24) driven by an electric motor (22). It further has an apparatus for continuously detecting an actual electrical value associated with the electric motor (22) during operation, an input apparatus for inputting a desired electrical value for the operation of said electric motor, a comparison apparatus (26) for comparing said electrical value with the actual electrical value, and a controller which regulates said electrical value by pulse width modulation (36).

11 Claims, 7 Drawing Sheets

OTHER PUBLICATIONS

Wikipedia, "PI Controller" http://en.wikipedia.org/wiki/PI_controller.

Free Dictionary, "PID Controller" http://encyclopedia.thefreedictionary.com.

* cited by examiner

FAN ARRANGEMENT IN WHICH THE CONSUMED ELECTRIC POWER IS INFLUENCED

CROSS-REFERENCE

The present application is a section 371 of PCT/EP08/09702, filed 17 Nov. 2008, published 28 May 2009 as WO-2009-065540, and further claims priority from German application DE 10 2007 057 100.5, filed 19 Nov. 2007, the disclosure of which is hereby incorporated by reference.

FIELD OF THE INVENTION

The present invention relates to a fan arrangement with influence on the electrical power that it consumes.

BACKGROUND

When a fan is driven by an electric motor, what results is a combination of the properties of the fan and the properties of the electric motor.

A variety of fan designs exist, e.g. radial fans, transverse-flow blowers, axial fans, and diagonal fans. Radial fans are divided into radial fans having backward-curved blades, and radial fans having forward-curved blades. There are likewise many further sub-types in the case of the other designs.

The properties of a fan result from the so-called fan output characteristic curve, which indicates the quantity of air per hour (m³/h) delivered by the fan at a particular static pressure $\Delta pf$ [Pascal], and from the motor characteristic curve, which indicates how much power the motor needs in order to deliver a specific quantity of air per hour.

The power requirement is further determined by the operating conditions of the fan. For example, when a fan is blowing air from outside into a room in which all the doors and windows are closed, the fan is operating at maximum static pressure. "Free outlet" blowing, conversely, means that the fan is located unrestrictedly in a space, and that no physical separation, and also no pressure difference, exists between its intake side and delivery side. This means that a free outlet fan has a different power requirement than a fan that is delivering air into the interior of a closed space.

An examination of the curve for a fan arrangement's power consumption plotted against generated volumetric air flow rate reveals that this power is highly dependent on the working point that is set, or on the pressure buildup in the fan. In the case of a radial fan, for example, maximum power is usually reached with free outlet, i.e. at a pressure elevation $\Delta pf=0$, whereas, for an axial fan, it is reached at a maximum pressure elevation $\Delta pf=$ maximum.

Radial fans are normally used at a higher static pressure. When they work without static pressure, i.e. in free-outlet fashion, they are being operated at their power limit, i.e. a radial fan must be designed for this operating point even though in practice it occurs seldom and in rather arbitrary fashion. This limits the power of such a fan under other operating conditions.

SUMMARY OF THE INVENTION

It is an object of the invention to make available a novel fan arrangement.

This object is achieved by employing both a controller which compares the electrical power being consumed with a predetermined maximum motor power, and a limiting arrangement for adjusting pulse-width modulation signals if the power being consumed exceeds the maximum permissible motor power.

Fan arrangements are normally designed so that the maximum permissible winding temperature of the electric motor is not exceeded at maximum electrical power consumption. This means that a fan arrangement of this kind is "under-stressed" for many applications, i.e. at most working points it is operating below its maximum permissible power level.

What is achieved by means of the invention is that a fan arrangement of this kind can be operated at its permissible power limit, i.e. an improved air output characteristic curve is obtained with the same fan. The approach in this context is to operate the fan arrangement always in the region of its maximum permissible power, i.e. at the power limit or close to it, and thereby to achieve a greater volumetric flow rate for the same counterpressure, i.e. to increase the air output without requiring a larger fan arrangement for that purpose. Different solutions may be produced in this context depending on the type of fan arrangement.

It is also important, in practical terms, that users are accustomed to modifying the air output of an axial fan by way of a rotation speed control system. The result of this can be, however, that the power consumed by the fan at maximum rotation speed becomes too high, with the consequence that the electric motor becomes too hot. With an axial fan this is normally the case only when the static pressure $\Delta pf$ to the left of the so-called saddle becomes very high. This is because the normal working range of an axial fan is just below the saddle, since flow detachments at the fan blades occur in the area of the saddle and produce a drastic increase in fan noise.

For this reason, a fan of this kind is operated with normal rotation speed control over a large portion of its operating range. If the electrical power consumed by the fan motor becomes too high, however, said power is limited, in the embodiment described below, to a permissible value. This makes it possible to operate the fan in speed-controlled fashion up to a predetermined volumetric flow rate, and then in power-limited fashion at even higher pressure. The advantage of this is that the air output of the fan can be modified, as usual, by way of the rotation speed control system. Only in maximum rotation speed ranges does power limiting become active, in this case, at high static pressure. For an axial fan, this is normally the case only with a static pressure to the left of the "saddle." The normal working range of an axial fan is just below the "saddle," and in this range the fan can be operated normally with its speed control system.

By operating the fan motor at its power limit, it is possible to achieve considerably greater air output with the same fan; this can be important in terms of cooling, especially on hot days.

BRIEF FIGURE DESCRIPTION

Further details and advantageous refinements of the invention are evident from the exemplifying embodiments, in no way to be understood as a limitation of the invention, that are described below and depicted in the drawings. In the drawings.

Figure 10:
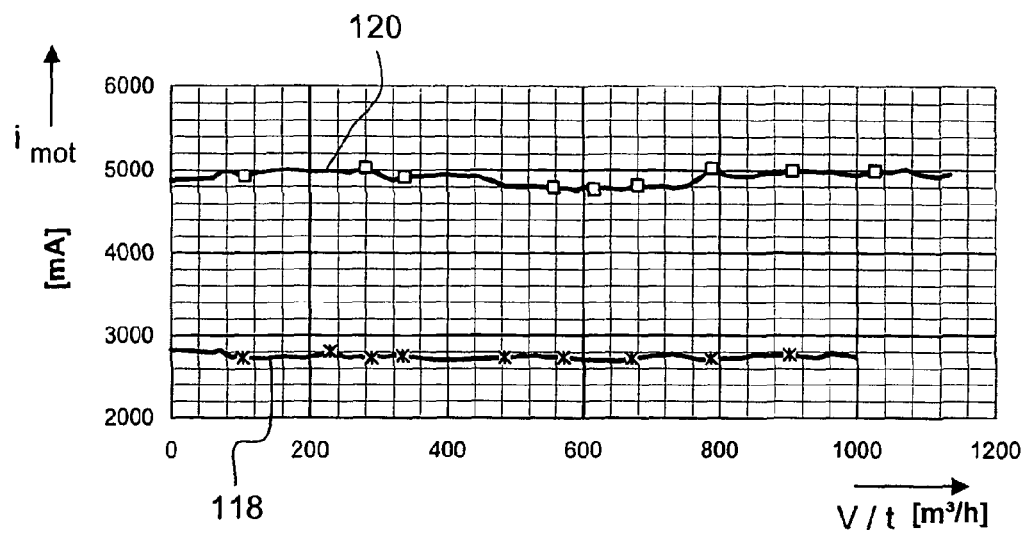
Figure 11:
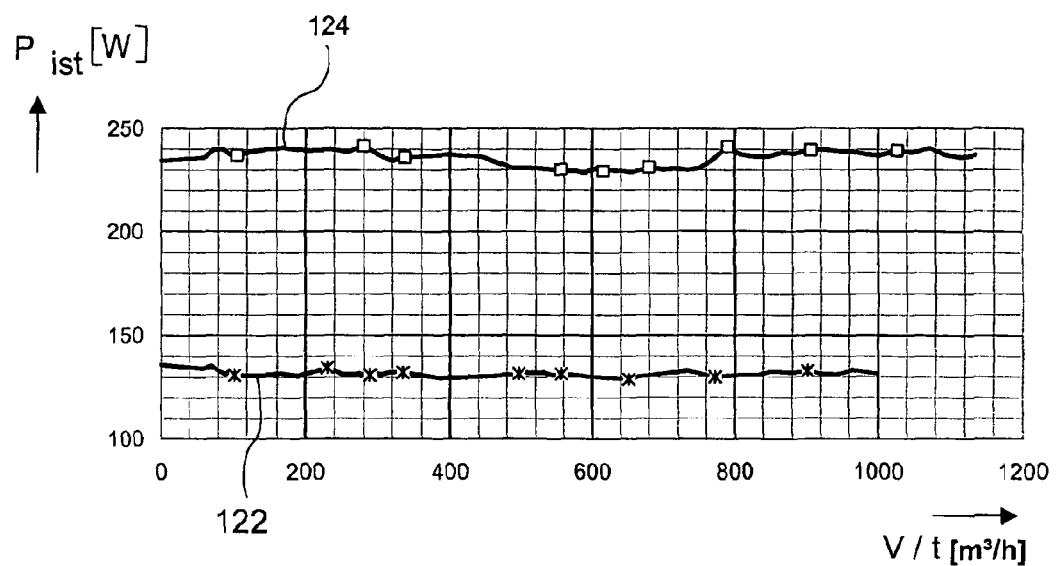

FIG. 10 shows motor current $i_{mot}$ as a function of volumetric flow rate V/t at a constant low power and at a higher constant power; and FIG. 11 shows the electrical power P (watts) consumed by motor 12 at a low constant power (curve 122) and at a higher constant power (curve 124); it is evident that the power during operation is held practically constant, so that the motor's power can be fully utilized.

DETAILED DESCRIPTION

Figure 1:
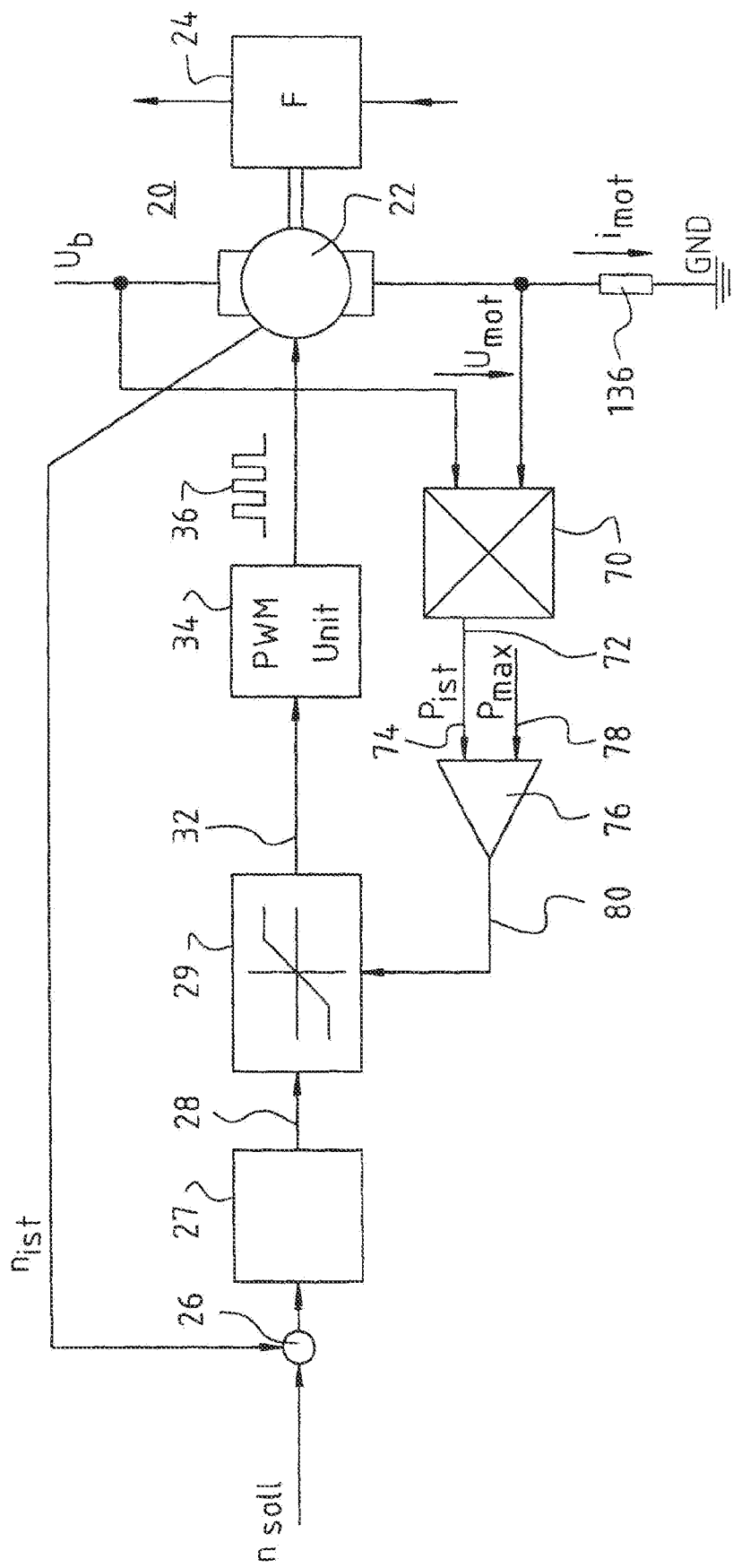
FIG. 1 shows an embodiment of a fan arrangement having a power-limited rotation speed controller.

FIG. 1 shows a preferred embodiment of a fan arrangement 20 having an electric motor 22 and a fan 24 driven thereby. The latter can be an axial fan, a radial fan, a diagonal fan, a transverse-flow blower, etc.

Figure 2:
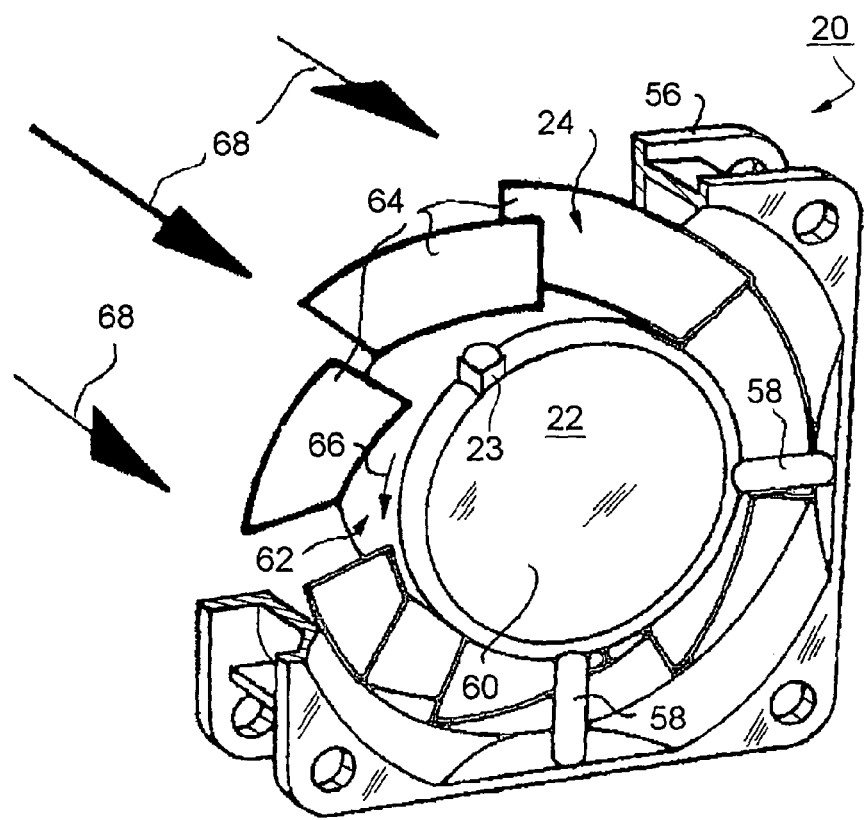
FIG. 2 is a perspective depiction of an axial fan, here in the form of a device fan that is used, for example, to cool desktop computers.

The rotation speed $n_{ist}$ of motor 22 can be regulated to a value $n_{soll}$. $n_{soll}$ is often determined by the temperature in the vicinity of fan arrangement 20, for example by means of a temperature sensor 23 as depicted in FIG. 2. This sensor can also be arranged outside fan 24.

For rotation speed control, the present rotation speed $n_{ist}$ of motor 22 is also continuously detected and is delivered to a comparator 26, along with the desired rotation speed $n_{soll}$ (see FIG. 1).

The output signal of comparator 26 is delivered to a controller 27 which, depending on requirements, can be, for example, a P controller, a PI controller, or a PID controller. Controller 27 has an output 28 at which a control input is obtained and is delivered to a limiter 29. The latter limits the control input to a predetermined value.

The limited signal at output 32 of limiter 29 is delivered to a PWM module 34 and transformed there into a PWM signal 36 that is delivered to motor 22 and controls current $i_{mot}$ therein. PWM modules of this kind are known.

Figure 3:
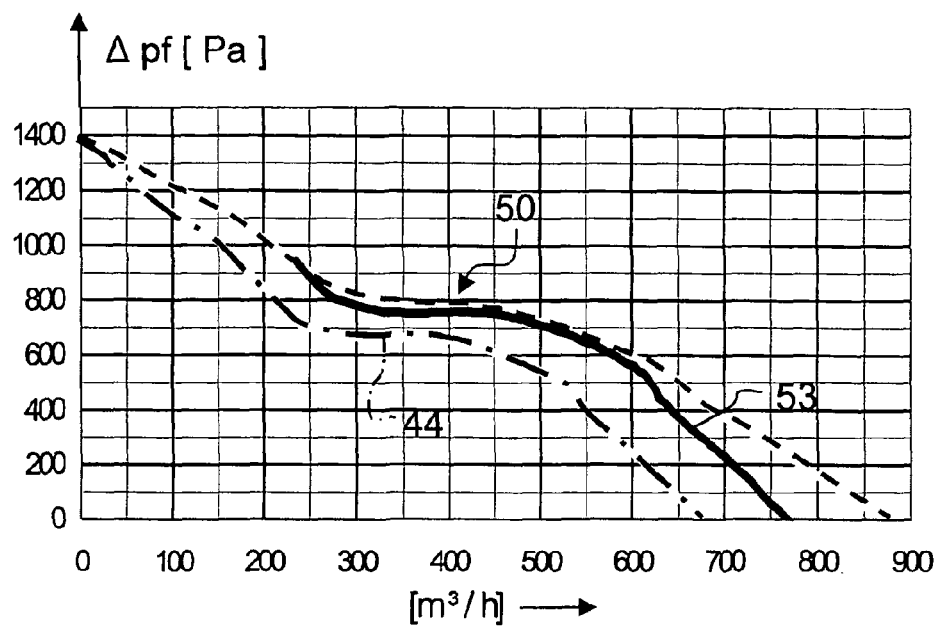
FIG. 3 shows an example of a fan characteristic curve of a fan arrangement according to FIG. 1.
Figure 4:
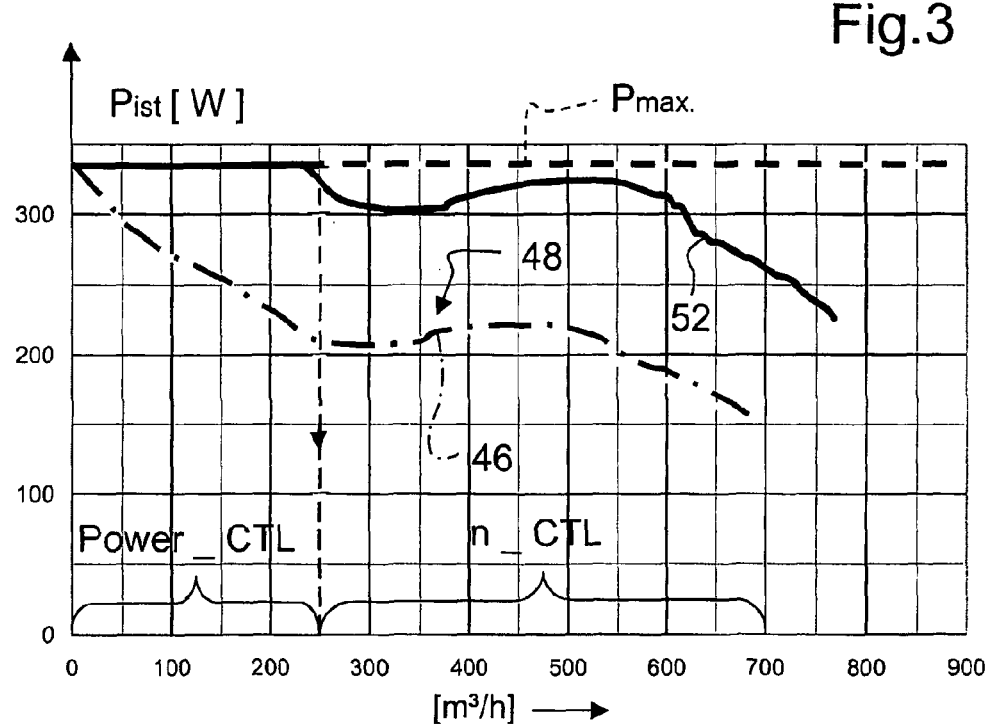
FIG. 4 shows a characteristic curve of power consumption as a function of air volume delivered per hour (m³/h) for an arrangement according to FIG. 1.

A fan arrangement according to FIG. 1 is normally designed so that its fan characteristic curve (FIG. 3), at a predetermined static pressure $\Delta pf$ that is equal to, for example, 1400 Pa in FIG. 3, reaches a delivery output of 0 m³/h with no need to take particular actions for that purpose (see curves 44 in FIGS. 3 and 46 in FIG. 4).

Curves 44, 46 of an axial fan as depicted in FIG. 2 have a so-called "saddle" that is labeled 48 in FIGS. 4 and 50 in FIG. 3.

Such fans are normally operated just below saddle 48 and 50 and at a low static pressure, i.e. in the case of FIGS. 3 and 4 at, for example, a delivery output of approximately 400 to 500 m³/h. The reason is that in the region of saddle 48, 50 and above it, a fan of this kind can generate very intense noise.

FIG. 2 shows, as an example for explanation, a typical axial fan 24 having a fan housing 56, which is depicted in section and in which is mounted, by means of struts 58, a hub 60 on which is journaled a rotor 62 on whose outer side are mounted fan blades 64 that rotate during operation in the direction of an arrow 66 and thereby deliver air in the direction of arrows 68.

Motor 22 of an axial fan of this kind is normally designed so that it operates on curves 44, 46 of FIGS. 3 and 4. This means, for example in FIG. 4, that at a maximum power of 340 W, the delivery output is equal to 0 m³/h. Motor 22 of a normal fan therefore automatically limits the power $P_{ist}$ that it consumes, and is physically designed for that purpose.

The present case is different: as FIG. 4 shows, in accordance with curve 52 fan motor 22, as a result of how it is constructed, limits the power $P_{ist}$ that it consumes in the range from 250 to 800 m³/h to a value that is less than $P_{max}$, i.e. in this range motor 22 can be operated with a normal rotation speed control system because its power consumption $P_{ist}$ is less than $P_{max}$, so that no additional interventions are necessary here.

Proceeding farther to the left in FIGS. 3 and 4, however, i.e. into the range from 0 to 250 m³/h, it is evident that at values below approximately 250 m³/h the permissible power $P_{max}$ of motor 22 would be exceeded, since motor 22 (unlike a "normal" motor having air output curve 46) has a lower induced voltage, i.e. it has fewer stator windings that are produced from a thicker wire, so that in accordance with curve 52 in FIG. 4, in the range between 0 and 250 m³/h it would exceed the permissible power $P_{max}$ which, in this example, is equal to 340 W.

This would create the risk that motor 22 might overheat and consequently be damaged or destroyed. This must be prevented, and for that reason the fan arrangement according to FIG. 1 has a power limiter that prevents $P_{max}$ from being exceeded. The fan arrangement thus operates here with Power_CTL, as indicated in FIG. 4. This power limiter detects voltage $u_{mot}$ at motor 22 and current $i_{mot}$ through motor 22, the latter e.g. at a measuring resistor 136. These two values are multiplied by one another in a multiplier 70 and this yields, at output 72 of multiplier 70, power $P_{ist}$ which is delivered to an input 74 of a comparator 76 whose other input 78 has delivered to it a value for the permissible power $P_{max}$. The signal at output 80 of comparator 76 is delivered to limiter 29 and thereby limits the control input at output 32 of limiter 29, but not until $P_{ist}$ becomes greater than $P_{max}$. This means that the permissible power $P_{max}$ cannot be exceeded. Alternatively, the duty factor of PWM signal 36 can also be directly influenced in the required fashion by the signal at output 80.

As a result of the invention, fan arrangement 22 is therefore influenced so that fan 24 (of whatever type) operates at its full output specifically at high static pressures and delivers more air in that context, of course with a higher power consumption.

It is very advantageous that a standard control circuit, in which the fan rotation speed is regulated by pulse width modulation, can be used for rotation speed control. In a deviation from the standard solution, however, the setting signal for PWM module 34 is limited as soon as the maximum motor power $P_{max}$ is reached. Alternatively, the duty factor of PWM signal 36 can also be limited directly when the power limit is reached.

Characteristic curves 52 in FIGS. 4 and 53 in FIG. 3 show, by way of example, the manner of operation. Up to a volumetric flow rate of approximately 250 m³/h, fan arrangement 20 runs in speed-controlled fashion, and at even higher pressure its power is then limited. This has the advantage that the air output of fan arrangement 20 can be modified, as is usual, by way of rotation speed control system n_CTL. Only at maximum rotation speed does the power limiter additionally become active in this case at high static pressure.

The arrangement described is very advantageous for all types of fans, since the user will still encounter the usual characteristics of a speed-controlled fan, but with increased fan air output.

Because fan motor 22 is operated at its maximum power limit ($P_{max}$ in FIG. 4), a considerably higher air output can be achieved with the same fan. It thus becomes possible always to operate such fans at the maximum permissible power, and thereby to achieve more volumetric flow at the same counterpressure, i.e. the fan's characteristic curve is electronically modified so the fan can be better utilized.

The same working principle is also possible, for example, with radial fans, where once again a considerable increase in air output is obtained. Such radial fans can then also preferably have a reduced number of stator windings, the wire diameter being increased in order to achieve the same copper fill factor.

If the operating voltage Ub of a fan arrangement 20 of this kind fluctuates, different motor currents $i_{mot}$ are produced at different voltages Ub. An arrangement 20 of this kind is designed, as standard, so that the maximum required power is achieved at rated voltage, and so that motor current $i_{mot}$ is reduced in the event of overvoltage. Motor 22 is therefore not utilized less effectively than in the case of comparable arrangements 20 of the existing art.

In the arrangement according to FIG. 1, the power limiter (multiplier 70, comparator 76) is of a higher order than the speed controller (elements 26, 27). This means that once the measured power $P_{ist}$ exceeds the value $P_{max}$ (at input 78 of comparator 76), no further increase in rotation speed is possible.

Figure 5:
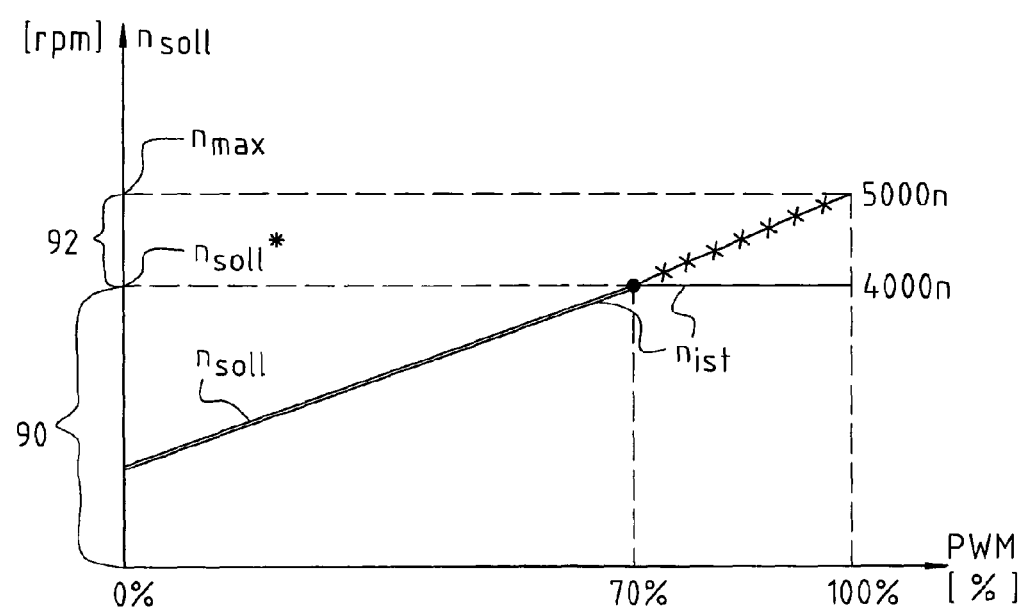
FIG. 5 is a diagram to explain a problem that can occur in practical use in the context of FIG. 1.

This situation is depicted schematically in FIG. 5, where the duty factor at the output of PWM module 34 is depicted on the abscissa, and the desired rotation speed (target rotation speed) $n_{soll}$ on the ordinate.

Also depicted is the target rotation speed $n_{soll}$*, shown in this case as 4000 rpm as an example, at which motor 22 is working at its maximum power $P_{max}$, in this case 100 W as an example. This speed $n_{soll}$* is not a constant value. In the case of a fan, for example, it depends on the so-called static pressure Δpf, i.e. if the fan is a radial fan and if the air flow at its outlet is throttled, the static pressure increases and the maximum permissible power, i.e. 100 W in the example, is already reached e.g. at a target rotation speed $n_{soll}$=3500 rpm. In this case, it would therefore not be possible to set a speed greater than 3500 rpm, since that would be prevented by the power controller.

When the maximum power is reached, the rotation speed therefore cannot be increased further, i.e. even though the user sets a higher rotation speed $n_{soll}$, this setting has no influence on the actual rotation speed $n_{ist}$ of motor 22.

This is depicted schematically in FIG. 5, where only the rotation speeds in a range 90 up to rotation speed $n_{soll}$* can be set, but not the speeds in a region 92 from $n_{soll}$* to $n_{max}$. This part of the $n_{soll}$ curve is therefore marked with Xs.

An operator might get the impression, from this, that speed controller 26, 27 is defective.

FIG. 5 also depicts the curve for the actual value $n_{ist}$ of the rotation speed. Up to the value $n_{soll}$* the curves for $n_{soll}$ and $n_{ist}$ proceed identically, but above $n_{soll}$* $n_{ist}$ remains constant even as $n_{soll}$ is further increased.

Figure 6:
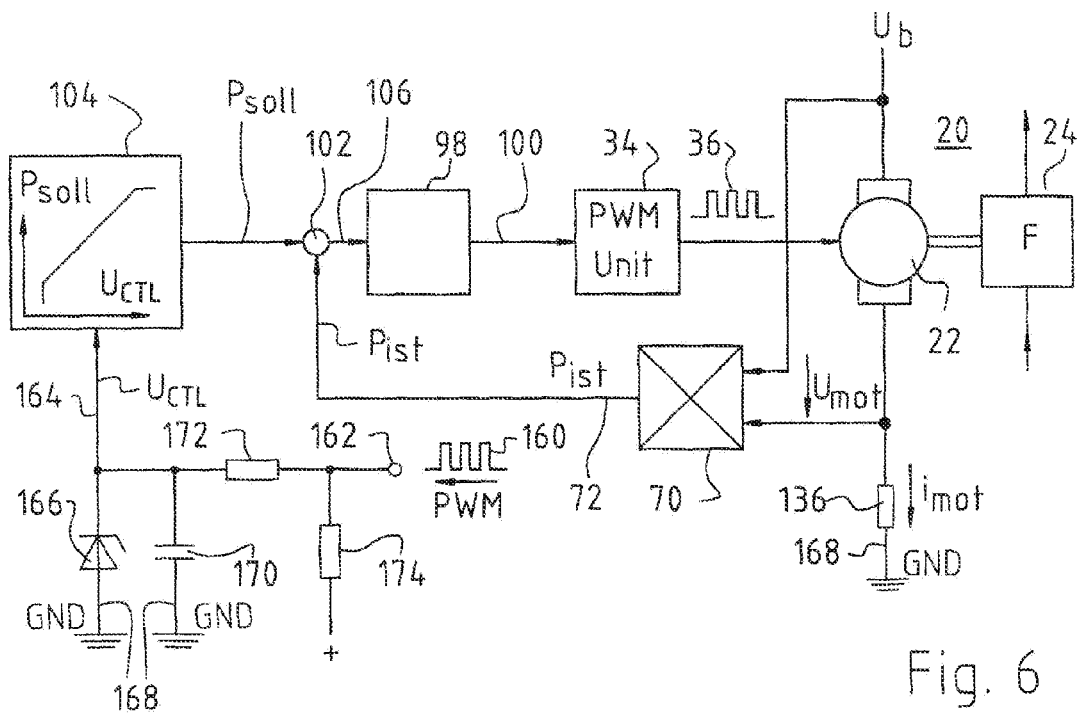
FIG. 6 shows a variant of FIG. 1.

This problem is avoided by the arrangement according to FIG. 6, in which the same reference characters as in FIG. 1 are used for identical or identically functioning parts.

Figure 7:
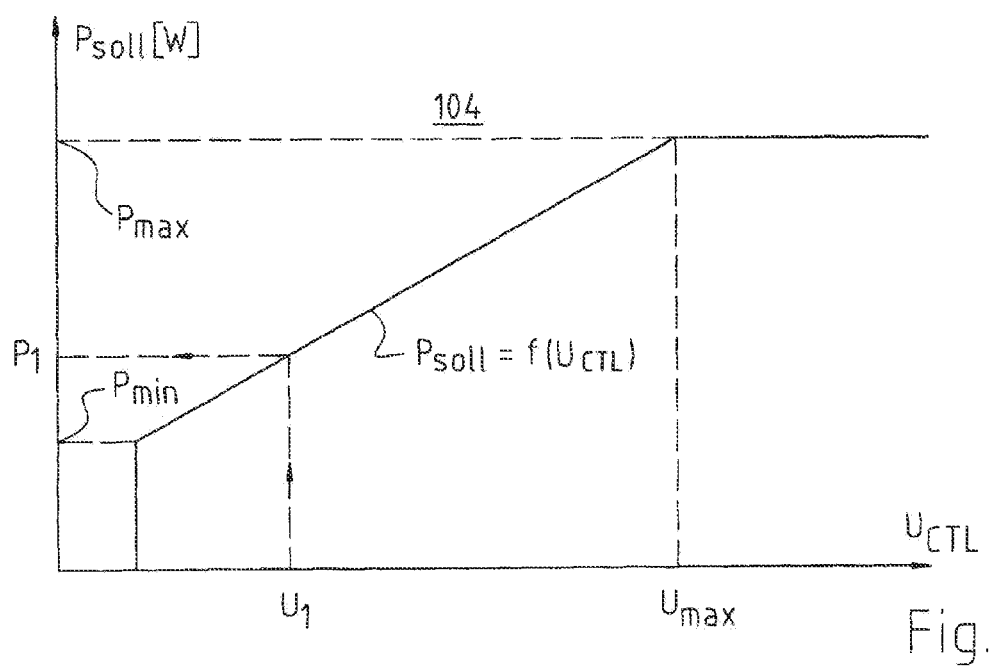
FIG. 7 is a diagram to explain FIG. 6.

In FIG. 7, a control signal $U_{CTL}$ is converted into a signal for a permissible target power value $P_{soll}$ which can be e.g. between $P_{min}$=5 W and $P_{max}$=100 W, and rotation speed $n_{ist}$ of motor 20 is modified until it generates the power set by means of $U_{CTL}$. This is therefore a power controller.

In FIG. 6, a controller 98 is provided which can be identical in construction to controller 27 of FIG. 1. Its output 100 is connected to the input of PWM unit 34, i.e. the magnitude of the signal at output 100 determines the duty cycle of PWM signal 36 at the output of PWM unit 34. To facilitate comprehension, it is assumed here that a rise in the signal at output 100 corresponds to a rise in the duty cycle and to a rise in motor current $i_{mot}$, as is the case for most motors.

The power $P_{ist}$ consumed by motor 22 is calculated in multiplier 70 by multiplying $i_{mot}$ and $u_{mot}$, and this value $P_{ist}$ is delivered to a comparator 102.

The target power value $P_{soll}$ is also delivered to comparator 102 from a target value unit 104, and the output signal 106 of comparator 102 is delivered to controller 98, which (via PWM unit 34) modifies the value $P_{ist}$ until $P_{ist}$=$P_{soll}$.

FIG. 6 also shows, as an example, how control signal $U_{CTL}$, which is delivered to an input of target value unit 104, can be generated from a PWM signal 160 that is delivered to a terminal 162.

Input 164 is connected to the cathode of a Zener diode 166 whose anode is connected to ground 168 and with which a capacitor 170 is connected in parallel. A resistor 172 is located between input 164 and terminal 162. Terminal 162 is connected via a resistor 174 to a positive voltage, e.g. +5 V.

PWM signal 160 is smoothed by RC element 172, 170. Zener diode 166 prevents voltage peaks in control signal $U_{CTL}$. The latter is converted in target value unit 104 into a target power value $P_{soll}$ for motor 22, which is delivered as described to comparator 102. PWM signal 160 can be converted in this fashion into a target power value for motor 22, and this target value increases as the duty cycle of PWM signal 160 increases.

FIG. 7 explains target value unit 104 of FIG. 6. This unit converts a control signal $U_{CTL}$ into a signal $P_{soll}$ for the desired power of motor 22. The value $P_{max}$ can be set in suitable fashion, for example using a Zener diode with which a constant voltage, which can correspond e.g. to maximum power $P_{max}$, is generated. A voltage divider, at which a value between $P_{min}$ and $P_{max}$ can be set, is then connected to this voltage. FIG. 7 shows as an example a voltage U1 that is converted into a target power P1.

FIGS. 8 to 11 show measured values for the power control system according to FIG. 6, for an RER190 radial fan of the EBM-PAPST company and for two different power settings, namely a low power of approximately 135 W and a higher power of approximately 235 W.

Figure 8:
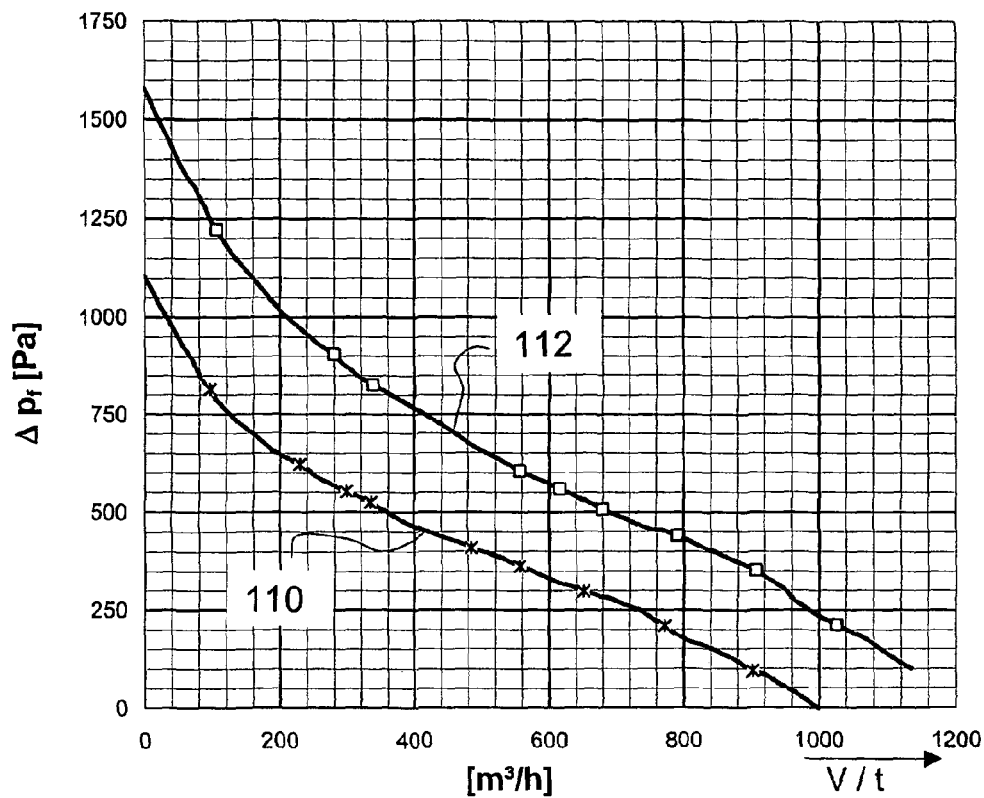
FIG. 8 shows measurement curves that were recorded using the variant according to FIG. 6; they show static pressure $\Delta pf$ as a function of volumetric flow rate V/t at a constant low power and at a constant higher power.

FIG. 8 shows static pressure Δpf as a function of volumetric flow rate. Curve 110 shows the result at a constant power that was regulated to 135 W, and curve 112 shows the result at a constant power of approximately 235 W. The curves run approximately parallel to one another. The volumetric flow rate was modified in the usual way by means of a measurement nozzle.

Figure 9:
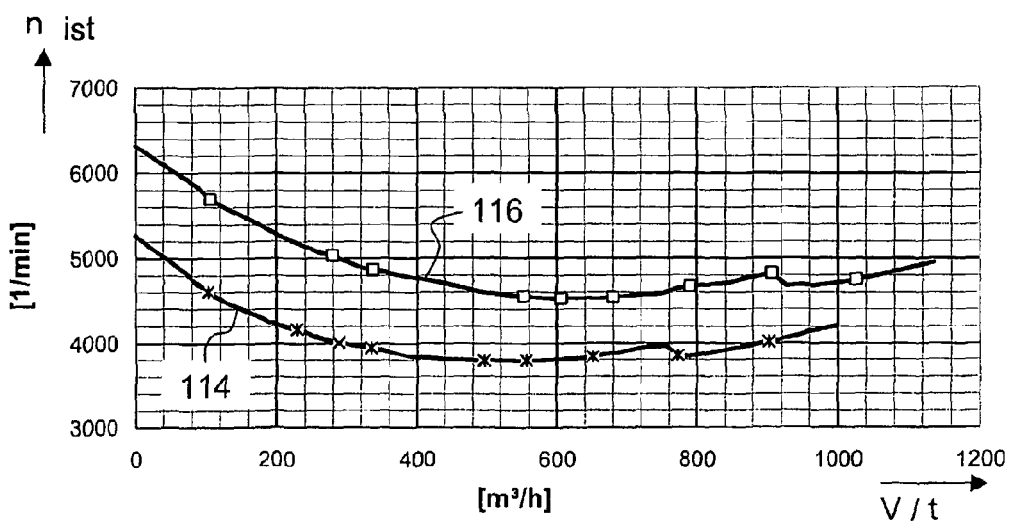
FIG. 9 shows measurement curves for FIG. 6; they show rotation speed as a function of volumetric flow rate at a low constant power and at a higher constant power.

FIG. 9 shows rotation speed $n_{ist}$ as a function of volumetric flow rate. The curve for 135 W is labeled 114, and the curve for 235 W is labeled 116. The volumetric flow rate was modified in the usual way by means of a measurement nozzle.

FIG. 10 shows motor current $i_{mot}$ as a function of volumetric flow rate. Because DC voltage Ub (in this case 48 V) was held constant in FIG. 6, current $i_{mot}$ is held constant by output controller 98. The curve for 135 W is labeled 118, the resulting current having been approximately 2.8 A; and the curve for 235 W is labeled 120, the current having been equal to about 5 Å. Here as well, the volumetric flow was modified using a measurement nozzle (not depicted).

FIG. 11 shows electrical power $P_{ist}$ consumed by motor 22 as a function of volumetric flow. Curve 122 shows the result for a constant power of 135 W, and curve 124 shows the result for a constant power of 235 W. The volumetric flow rate was modified by means of a measurement nozzle (not depicted).

The constant power was set in FIGS. 6 to 11 by means of control voltage $U_{CTL}$, which in this case was 5 V for the lower power (135 W) and 10 V for the higher power (235 W).

Many variants and modifications are of course possible in the context of the present invention.

What is claimed is:

1. A fan arrangement (20) having a fan (24) driven by an electric motor (22),
which fan arrangement comprises:
   an apparatus for detecting the electrical power ($P_{ist}$) consumed, during operation, by the electric motor (22);
   an input apparatus (28) for inputting a desired rotation speed ($n_{soll}$) of said electric motor;
   a comparison apparatus (26) for comparing the desired rotation speed ($n_{soll}$) with the actual rotation speed ($n_{ist}$) of said fan arrangement (20);
   a controller (27), which regulates the rotation speed of the electric motor (22) by pulse width modulation (34);
   a comparator (76), which compares the electrical power ($P_{ist}$) consumed by the fan arrangement (20) with a predetermined characteristic value ($P_{max}$) for the fan arrangement (20), which value is characteristic of a maximum permissible motor power; and
   a limiting arrangement (29) for limiting the output signals (36) of the pulse width modulation (34) whenever the electrical power ($P_{ist}$) consumed by the fan arrangement (20) exceeds said maximum permissible motor power ($P_{max}$).

2. The fan arrangement according to claim 1, wherein said apparatus for detecting power consumed includes
   an apparatus (70) coupled to a winding of said motor for multiplying a variable dependent on the detected motor current ($i_{mot}$) by a variable dependent on the detected motor voltage ($u_{mot}$), in order to generate an output signal (72) representing the electrical power ($P_{ist}$) consumed by the electric motor (22), said output signal (72) being applied to an input of said comparator (76).

3. The fan arrangement according to claim 1, further comprising
   a PWM generator (34) which, during operation, generates a control signal (36) specifying what current ($i_{mot}$) is delivered to the electric motor (22).

4. The fan arrangement according to claim 3, wherein,
   in order to limit the motor power ($P_{max}$), the PWM signals (36) are modified when a maximum permissible motor power ($P_{max}$) is reached.

5. The fan arrangement according to claim 4, wherein, in order to limit power, an input signal of the PWM generator (34) is limited.

6. The fan arrangement according to claim 4, wherein the output signals (36) from the PWM generator (34) are correspondingly influenced in order to limit power.

7. The fan arrangement according to claim 4, wherein
   the PWM generator (34) is controlled by the output of the controller (27) via said limiting arrangement (29), and limitation of the PWM signal (36) occurs by nothing corresponding control of the limiting arrangement (29).

8. The fan arrangement according to claim 1, wherein
   the motor (22) is designed and dimensioned for a higher rotation speed than the rotation speed at which it is operated, in order to avoid automatically limiting the electrical power consumed by the motor.

9. A fan arrangement (20) having a fan (24) driven by an electric motor (22), which fan arrangement comprises:
   an apparatus for detecting the electrical power ($P_{ist}$) consumed by the electric motor (22) during operation;
   an input apparatus (28) for inputting a signal ($U_{CTL}$) for the desired power ($P_{soll}$) of the electric motor (22);
   a comparison apparatus (26) for comparing the desired power ($P_{soll}$) with the actual electrical power ($P_{ist}$) consumed during operation by the electric motor (22); and
   a controller (98) which is configured to regulate
the power consumption of the electric motor (22),
by pulse width modulation (34), to the desired power ($P_{soll}$).

10. The fan arrangement according to claim 9,
   which is configured so that the desired power ($P_{soll}$) can be set only as high as a predetermined maximum value ($P_{max}$).

11. The fan arrangement according to claim 10, further comprising input means (78) to modify the predetermined maximum value ($P_{max}$).

* * * * *